United States Patent [19]
Cunningham et al.

[11] Patent Number: 5,337,256
[45] Date of Patent: Aug. 9, 1994

[54] WHEEL BALANCER WITH MULTIPLE OPERATOR INTERFACE

[75] Inventors: Charles L. Cunningham, Nashville; Ronald W. Carter, Murfreesboro, both of Tenn.

[73] Assignee: Service Station Products Company, Wilmington, Del.

[21] Appl. No.: 952,584

[22] Filed: Sep. 28, 1992

[51] Int. Cl.⁵ .............................................. G06F 15/31
[52] U.S. Cl. ................................... 364/508; 73/462; 73/459
[58] Field of Search ............... 364/508, 550, 571, 463; 73/462, 459, 468, 460

[56] References Cited
U.S. PATENT DOCUMENTS

| Re. 31,971 | 8/1985 | Gold | 73/462 |
|---|---|---|---|
| 4,204,255 | 5/1980 | Cremer | 364/424.05 |
| 4,338,818 | 7/1982 | Hill et al. | 73/462 |
| 4,450,529 | 5/1984 | Hill et al. | 364/508 |
| 4,457,172 | 7/1984 | Mathes et al. | 73/462 |
| 4,608,650 | 8/1986 | Kapadia | 364/508 |
| 4,977,510 | 12/1990 | Winzenz et al. | 364/508 |
| 5,237,505 | 8/1993 | Beebe | 364/463 |

Primary Examiner—Thomas G. Black
Assistant Examiner—Jacques Harold Louis-Jacques
Attorney, Agent, or Firm—Mark J. Patterson; Edward D. Lanquist, Jr.; I. C. Waddey, Jr.

[57] ABSTRACT

An electronic wheel balancer apparatus includes an operator interface which adapts the device for concurrent use by multiple operators. A microprocessor works in conjunction with internal memory units to save and retrieve data associated with each operator for use by the processor when a selected operator is actively in control of the balancer.

7 Claims, 2 Drawing Sheets

WHEEL BALANCER WITH MULTIPLE OPERATOR INTERFACE

BACKGROUND OF THE INVENTION

The present invention relates generally to devices used to balance motor vehicle wheel and tire assemblies and more particularly to an electronic wheel balancer capable of concurrently servicing multiple operators.

Because wheel balancers are more expensive to own and operate than are tire changers, most tire shops have two or more tire changers for each wheel balancer. Also, a wheel and tire assembly can be balanced faster than it can be deflated and remounted. Consequently, a service backlog can develop when more than one tire mechanic may need to use the same balancer.

This situation is particular acute where "match mount" balancing is being performed. During match mount, the tire mechanic uses the balancer to identify the heaviest point on a tire and then seeks to "match" this point with the lightest point on the associated wheel, as a preliminary step in the balancing procedure. To accomplish this, the tire and wheel assembly must be removed from the balancer and taken to the tire changer, where it is broken down so that the tire can be rotated with respect to the wheel. It is then returned to the balancer to confirm the match and complete the balancing process.

In prior art balancers, the balancer cannot be used by a second operator during the interval when the tire and wheel assembly is being remounted, or lost data will result. Even in a non-match mount situation, where a tire mechanic is mounting and balancing four tires from the same car, data re-entry can be a problem. If a second mechanic uses the balancer while the first mechanic is mounting one of the four tires, the second mechanic will have to enter new data identifying the dimensions of the wheel in question, along with the desired balancing mode to be used on the machine. When the first mechanic returns to the balancer, unless the wheels are identically sized, he will have to re-enter his data. Obviously, this can cause delays and presents more opportunity for incorrect data entry.

What is needed, then, is a wheel balancer which can be used concurrently by two or more operators without causing loss of data or requiring one of the operators to re-enter data. This device is presently lacking in the prior art.

SUMMARY OF THE INVENTION

In the present invention, a conventional electronic wheel balancer is controlled by a microprocessor which communicates directly with a keyboard, display, program memory, active data memory, and operator specific data memory units. Means are provided on the keyboard for an operator to switch the balancer from a first active operator to a second operator. Upon sensing such switch, the processor of the balancer saves data specific to the first active operator to an operator specific data memory unit and retrieves any data previously stored in such unit which corresponds to the second operator, when such operator was active. Such operator specific data can include wheel dimensional information, data obtained by imbalance force transducers in the balancer, and data reflecting the balancer mode and status at the time when the last operator switch occurred. Switching the balancer apparatus from one active operator to another can continue repeatedly without loss of any needed data previously entered by any operator or loss of intermediate data generated by the balancer apparatus during an extended balancing operation, such as a match mount. The balancer operator interface includes a visual indication of the operator then selected to be active.

An object of the present invention, then, is to provide a wheel balancer which can be used concurrently by more than one operator without loss of wheel dimension, transducer, balancer mode, or other operator specific data.

Another object of the present invention is to minimize the need for a wheel balancer operator to re-enter data associated with the balancing of a group of tire and wheel assemblies, such as from the same vehicle, even if the balancer is used by a second operator while the first operator is temporarily away from the balancer.

Another object of the present invention is to improve efficiency of wheel balancers and minimize delays caused by the use of such balancers in tire shops to perform match mount and other extended balancing procedures.

DESCRIPTION OF THE PREFERRED EMBODIMENT

The wheel balancer of the present invention combines an electronic wheel balancer of generally conventional design with a novel operator interface and data management system which permits more than one operator to concurrently use the balancer without loss of operator specific data which would otherwise occur during operator changeover.

Figure 1:
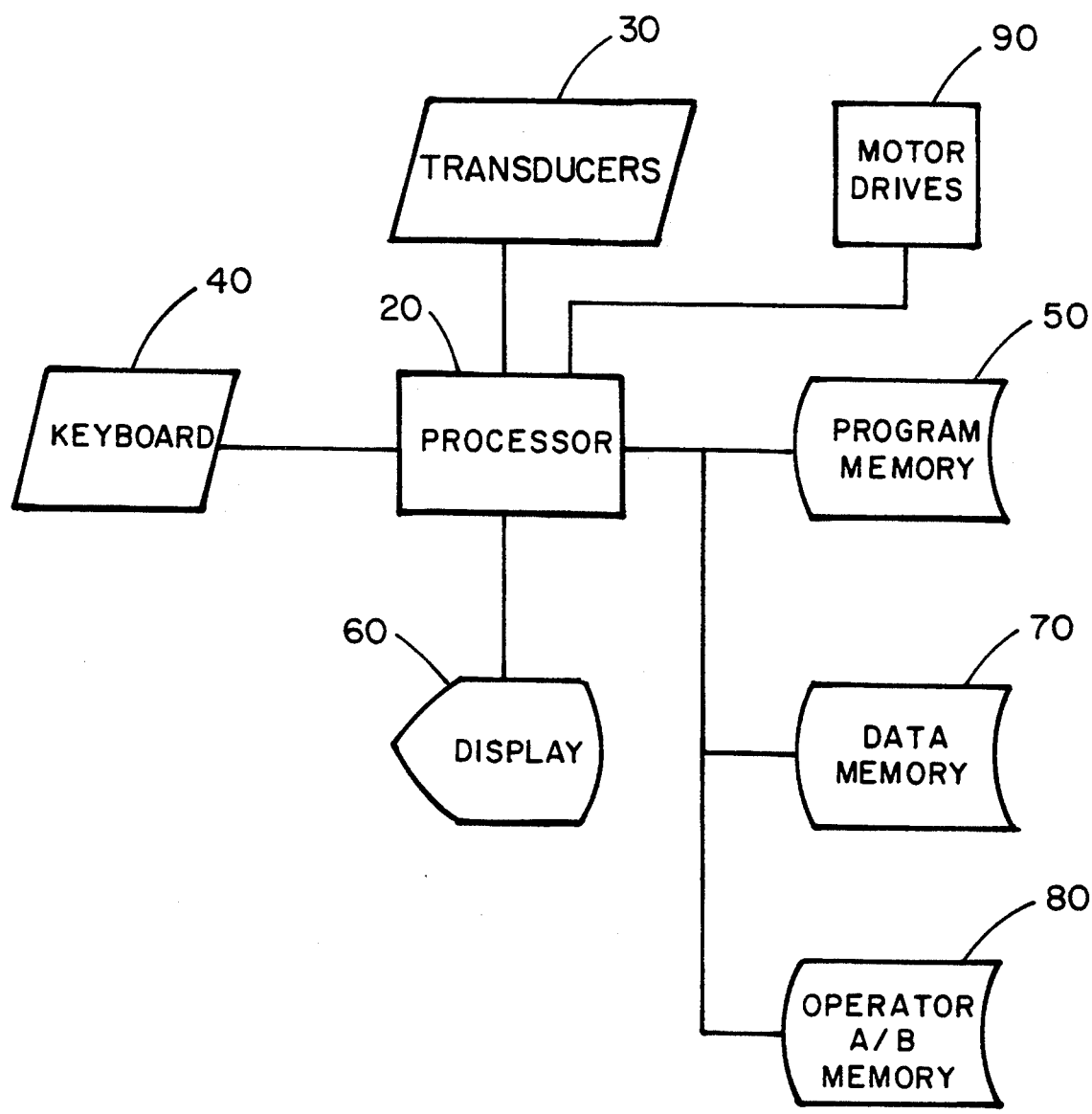
FIG. 1 is a block diagram of the electronic systems of the wheel balancer of the present invention.

As shown in FIG. 1, an electronic wheel balancer device 10 is controlled primarily by a microprocessor 20 which interfaces and communicates directly with the other essential subsystems of device 10. Data responsive to the magnitude and position of out of balance tire and wheel assemblies is obtained in a conventional manner by transducer system 30, where it is filtered and digitized before being presented to processor 20. Again, in a conventional manner, data from transducer system 30 is obtained while the tire and wheel assembly is being rotated by a motor integral to device 10 (not shown) controlled by motor controller unit 90, which also communicates with processor 20. A variety of conventional motor drive and wheel balancer transducer systems can be used such as, for example, that described in U.S. Pat. No. 4,423,623, issued Jan. 3, 1984, to QYL, Inc.

The operations of processor 20 are controlled in part by the contents of program memory unit 50 in which transducer data algorithms and process control routines have been pre-loaded. Selection of the appropriate programs and routines stored in program memory unit 50, in turn, are made initially by an operator who will manually select the balancer mode at keyboard 40. For example, keyboard 40 and display unit 60 will visually give the operator a choice of conventional balancing mode or match mount balancing mode, the latter of which requires removal and partial demounting of the tire and wheel assembly while the balancing procedure is underway.

Operation of processor 20 is also affected by other data entered by the operator at keyboard 40. Such data in conventional prior art wheel balancing machines will typically include: (a) wheel parameters (AWD offset, wheel width, wheel diameter, etc.); and (b) weight display information (e.g., ounce versus grams, display round-off). This data, including any pending data obtained from transducer system 30, will be saved by processor 20 to active data memory unit 70 and displayed at the appropriate times on display unit 60.

In the present invention, additional data capture and storage steps are included. In the preferred embodiment, balancer device 10 will be concurrently available to two operators, one of whom will be referred to as Operator A and the second as Operator B. Accordingly, display 60 will include a visual indication of which operator, A or B, is then active, meaning that such operator is then in control of device 10, and that any data associated with that operator needs to be available to processor 20. The other operator will, conversely, be inactive. Keyboard 40 will include manual means for switching from Operator A to Operator B and vice-versa. Further, additional data storage is provided by Operator A/B memory unit 80 whereby operator specific contents of active data memory unit 70, associated with Operator A, can be temporarily saved while Operator B is active and vice-versa. In the preferred embodiment, Operator A/B memory unit 80 will include memory dedicated to data specific to Operator A and also to data specific to Operator B. Such operator specific data can include the wheel parameter and weight display data described above. In addition, if device 10 is being used in a multiple step balancing mode, match mount, for example, processor 20 will also save to Operator A/B memory unit 80 information identifying where the previously active operator was in such step sequence at the time that such second operator was switched to inactive.

To accommodate multiple concurrent Operator A and B operations, processor 20 includes internal electronic flags which are responsive to whether Operator A or Operator B is active, and separate first time Operator A and Operator B flags. The purpose of the latter flags is to prevent the transfer and use of meaningless data from active data memory unit 70 to Operator A/B memory unit 80, and vice-versa, during the first use after power up of device 10 by each operator.

Figure 2:
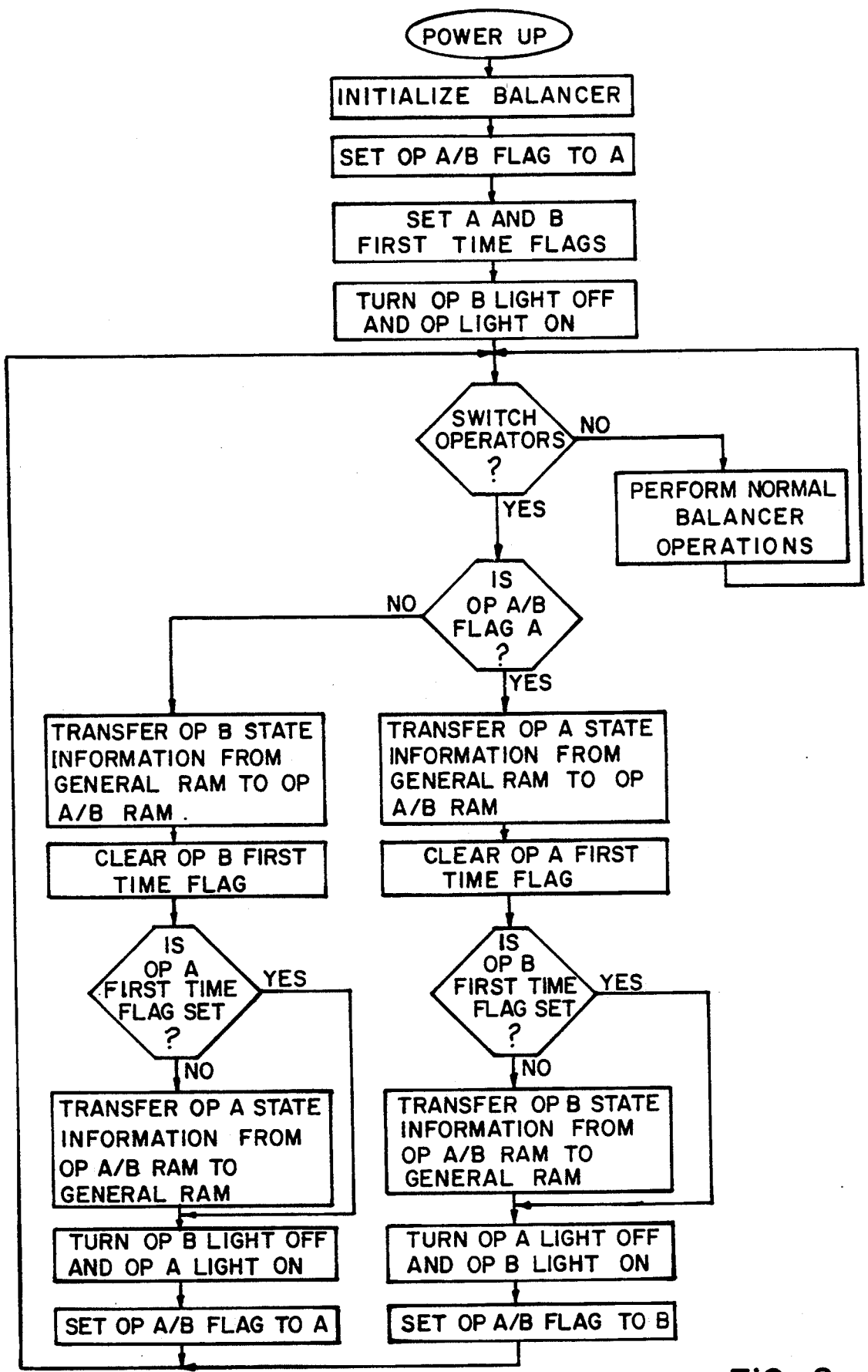
FIG. 2 is a flow chart showing the internal operations of a two operator embodiment of the present invention.

Looking now at FIG. 2, a sequence of internal operations of device 10 is shown, for a two concurrent operator embodiment. When device 10 is first powered up, processor 20 initializes all subsystems in a conventional manner. In addition, Operator A/B flag of processor 20 is set to "A" and first time Operator A and Operator B flags are both set to "Yes". A signal is also sent to display unit 60 (FIG. 1) indicating that balancer device 10 is ready for use by Operator A as the active operator.

Usually a specific mechanic on duty in a tire shop will be assigned as Operator A and another mechanic as Operator B. Processor 20 will wait for input from keyboard 40 indicating whether an operator switch is to occur, which will result in resetting of Operator A/B flag from A to B or vice-versa. As long as no operator switch is detected, device 10 will perform the normal balancer operations, using the data then stored in active data memory unit 70.

If an operator switch is detected, processor 20 then looks at the status of the Operator A/B flag. Assuming that the flag is then set to Operator A, as in immediately after initial power up, Operator A specific data is moved from active data memory unit 70 to Operator A/B memory unit 80. The Operator A first time flag is then cleared. Processor 20 then looks to see if the Operator B first time flag is set, thereby indicating that the Operator B specific data in memory unit 80 is not be used. Otherwise, Operator B specific data from memory unit 80 is moved to memory unit 70, readying device 10 for use by Operator B as the active operator. Display unit 60 is also signalled by processor 20 to visually indicate that Operator B is now active and that Operator A/B flag has been set to B.

As seen in FIG. 2, when Operator A returns and signals an operator switch from keyboard 40, Operator B specific data is moved from active data memory unit 70 to Operator A/B memory unit 80 while Operator A specific data is reloaded from memory unit 80 to active data memory unit 70. Normal balancer operations then proceed.

In the preferred embodiment, memory unit 50 can be an EPROM chip (or other form of non-volatile memory), while memory units 70 and 80 are conventional random access memory (RAM) chips compatible with conventional microprocessor unit 20 and, in fact, can be physically and electronically part of the same RAM chip although separately addressed. If desired, a non-volatile memory device, such as a floppy magnetic disk, can also be used as a storage medium for memory units 50, 70, and 80. Also, those skilled in the art will appreciate that by adding sufficient memory and internal indicator flags, device 10 can concurrently accommodate more than two operators without departing from the scope and intent of the present invention.

Thus, although there have been described particular embodiments of the present invention of a new and useful wheel balancer with multiple operator interface, it is not intended that such references be construed as limitations upon the scope of this invention except as set forth in the following claims. Further, although there have been described certain process steps used in the preferred embodiment, it is not intended that such steps be construed as limitations upon the scope of this invention except as set forth in the following claims.

What is claimed is:

1. A microprocessor-controlled apparatus for determining an imbalance in a rotating tire and wheel assembly in a sequence of steps, said apparatus including means for rotating said assembly, and imbalance force transducer means, comprising:

a. keyboard means for selecting an active operator of said apparatus and for entering data specifically associated with said active operator;
   b. active data storage means for storing said entered operator specific data for use by said processor when said associated operator is said active operator; operator data storage means for saving operator specific data, including said entered operator specific data, when said operator associated with said data is an inactive operator of said apparatus; and
   d. processor means responsive to said active operator selection means for moving said operator specific data corresponding to said selected active operator from said operator data storage means to said active data storage means and for moving said data in said active data storage means associated with said inactive operator to said operator data storage means; and e. said processor means, said active data storage means, and said operator data storage means are adapted for temporarily interrupting said sequence of steps in response to said keyboard means whereby said sequence of steps may be resumed when said inactive operator becomes said active operator of said apparatus.

2. The apparatus of claim 1 wherein said operator specific data comprises dimensional data describing said tire and wheel assembly, imbalance force output data from said transducer means, and data defining an operational mode of said apparatus selected by said associated active operator at said keyboard.

3. The apparatus of claim 2 where said operator specific data further comprises data describing which of said steps in said sequence at which said apparatus was operating when said operator associated with said data becomes said inactive operator.

4. A wheel balancer apparatus comprising:
 a. means to rotate a tire and wheel assembly;
 b. means to determine in an interruptable sequence of steps imbalance forces produced in said rotating tire and wheel assembly;
 c. an operator interface, including a display and data entry keys, said operator interface adapted for concurrent use by one active operator and at least one inactive operator;
 d. means to save data associated with the operation of said apparatus by said at least one inactive operator, including data entered by said operators at said operator interface and data displayed on said operator interface when said operators were said active operator; and
 e. means to retrieve for use by said apparatus said saved inactive operator data associated with a said at least one inactive operator who becomes a said active operator, whereby said apparatus can resume operation at a step in said sequence when said sequence was interrupted by a change in operators.

5. A method of determining an imbalance in plural tire and wheel assemblies using a single wheel balancer apparatus in conjunction with multiple operators, one of said operators being an active operator of said apparatus while the other of said operators are inactive, said method including a sequence of balancing steps and further comprising the steps of:
 a. Selecting on said apparatus a said active operator;
 b. entering at said apparatus operator specific data specifically associated with each of said operators when said operators are said selected active operator;
 c. saving in said apparatus said entered operator specific data and data produced by said apparatus in association with a balancing operation selected by each of said operators, at a step in said sequence of balancing steps when said operators become a said inactive operator;
 d. retrieving for use in said apparatus said saved operator specific data, when said operator associated with said data is selected as said active operator; and
 e. resuming said sequence of balancing steps at said step when said operators associated with said saved operator specific data became a said inactive operator.

6. The method of claim 5 where said saved operator specific data comprises information defining an operational mode of said apparatus dimensional information associate with said wheel assembly.

7. A wheel balancer apparatus, including imbalance force transducer means, said apparatus adapted for concurrent use by multiple operators including one active operator and at least one inactive operator, comprising:
 a. a processor adapted for coordinating in said apparatus an interruptable sequence of balancing steps;
 b. means to store for use by said processor data associated with said active operator;
 c. means to save data associated with said at least one inactive operator, including data produced by said force transducer means; and
 d. means, operatively communicating with said processor, for selecting said active operator from said multiple operators; and
 e. said data associated with said at least one inactive operator include data identifying a step in said sequence of balancing steps when said sequence was interrupted, whereby said sequence can be resumed.

* * * * *